Nov. 20, 1923.  1,475,068
P. HAMILTON
ESCAPEMENT
Filed Dec. 5, 1922
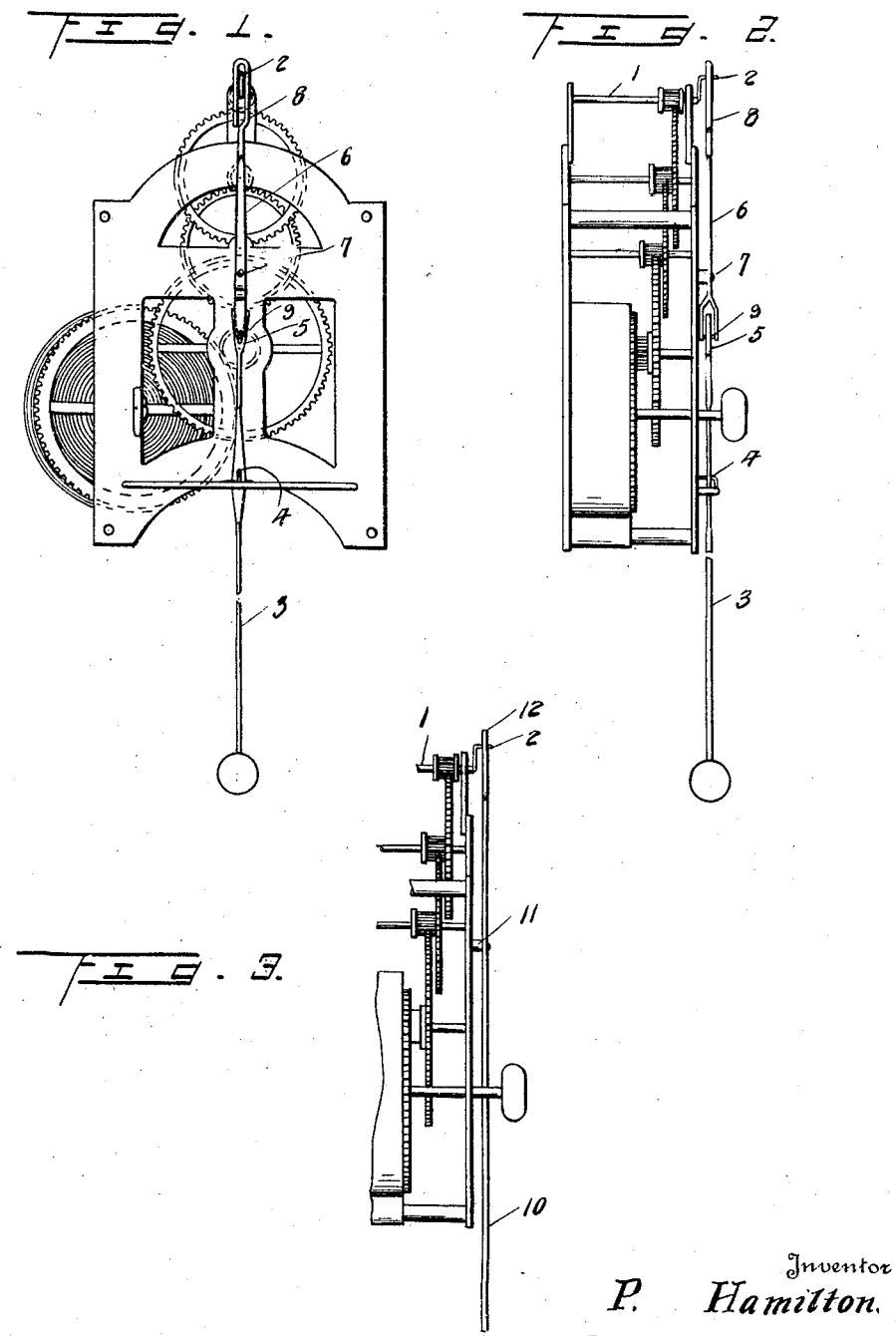
Inventor
P. Hamilton.
By
Attorney Patented Nov. 20, 1923.

1,475,068

UNITED STATES PATENT OFFICE.

PORTER HAMILTON, OF LA GRANGE, KENTUCKY.

ESCAPEMENT.

Application filed December 5, 1922. Serial No. 605,049.

*To all whom it may concern:*

Be it known that I, PORTER HAMILTON, a citizen of the United States, residing at La Grange, in the county of Oldham and State of Kentucky, have invented certain new and useful Improvements in Escapements; and I do hereby declare the following to be a full, clear, and exact description of the invention, such as will enable others skilled in the art to which it appertains to make and use the same.

The present invention relates to time mechanism and more particularly to the escapment for controlling time movements, said escapment in accordance with the present invention embodying a power driven arbor having a crank or equivalent part and a pendulum in engagement with the crank of the power driven arbor and oscillated thereby, whereby to control the speed of the movement.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is an elevation of a clock movement provided with an escapement embodying the invention, Figure 2 is a side view thereof, and Figure 3 is a modification.

Corresponding and like parts are referred to in the following description and designated in the several views of the drawings by like reference characters.

The numeral 1 designates the power driven arbor of a time movement of any nature, make or design. The power driven arbor 1 is provided with a crank 2 or equivalent part and the same cooperates with a pendulum rod whereby to control the speed of the movement. Referring to Figures 1 and 2, the pendulum rod 3 is pivoted intermediate its ends, as indicated at 4, and is provided at its upper end with a fork 5 or like part. A lever 6, pivoted intermediate its ends, as indicated at 7, is provided at its upper end with a loop 8 which coacts with the crank 2, whereby an oscillatory movement is imparted to said lever. A suitable bearing 9 at the lower end of the lever 6 engages the fork 5 of the pendulum rod 3, whereby to impart an oscillatory movement to the latter.

In the modification shown in Figure 3, the pendulum rod 10 is pivoted intermediate its ends, as indicated at 11, and its upper end is provided with a fork 12 which receives the crank 2 or equivalent part of the power driven arbor 1. In the modification, the pendulum rod is oscillated directly by the crank of the power driven arbor, whereas in the construction shown in Figures 1 and 2, the pendulum rod 3 is driven from the power driven arbor through interposition of the lever 6.

What is claimed is:

An escapement for a time movement, comprising a power driven arbor provided with a crank, a pendulum rod pivoted intermediate its ends, and a lever pivoted intermediate its ends and having one end in cooperative relation with the crank of the power driven arbor and having the opposite end in engagement with the pendulum rod whereby to effect an oscillatory movement thereof.

In testimony whereof I affix my signature in presence of two witnesses.

PORTER HAMILTON.

Witnesses:
 ENOCH OWEN,
 D. E. WOOLDRIDGE.